US011297482B2

(12) United States Patent
Gladish et al.

(10) Patent No.: US 11,297,482 B2
(45) **Date of Patent: *Apr. 5, 2022**

(54) PERIPHERAL VIDEO PRESENCE DETECTION

(71) Applicant: Comcast Cable Communications, LLC, Philadelphia, PA (US)

(72) Inventors: Jacob Gladish, Blue Bell, PA (US); Karen Swoyer, Ridley Park, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,812

(22) Filed: Nov. 18, 2020

(65) Prior Publication Data

US 2021/0076189 A1 Mar. 11, 2021

Related U.S. Application Data

(63) Continuation of application No. 16/205,574, filed on Nov. 30, 2018, now Pat. No. 10,873,846.

(51) Int. Cl.

| | |
|---|---|
| ***H04W 8/00*** | (2009.01) |
| ***H04N 5/232*** | (2006.01) |
| ***H04N 5/247*** | (2006.01) |
| ***H04W 4/029*** | (2018.01) |
| ***H04N 7/025*** | (2006.01) |
| ***G06K 9/00*** | (2006.01) |

(52) U.S. Cl.

CPC ........ *H04W 8/005* (2013.01); *H04N 5/23299* (2018.08); *H04N 5/247* (2013.01); *H04W 4/029* (2018.02); *G06K 9/00771* (2013.01); *G06K 2209/27* (2013.01); *H04N 7/025* (2013.01)

(58) Field of Classification Search

CPC ........... G06K 2209/27; G06K 9/00771; H04N 5/23299; H04N 5/247; H04N 7/025; H04W 4/029; H04W 8/005

See application file for complete search history.

(56) References Cited

U.S. PATENT DOCUMENTS

| | | | | |
|---|---|---|---|---|
| 8,184,154 | B2 | 5/2012 | Estevez et al. | |
| 10,594,987 | B1 * | 3/2020 | Nixon | H04W 4/023 |
| 2002/0121969 | A1 | 9/2002 | Joao | |
| 2015/0339912 | A1 | 11/2015 | Farrand et al. | |
| 2016/0127931 | A1 | 5/2016 | Baxley et al. | |
| 2017/0019644 | A1 * | 1/2017 | K V | B64C 39/02 |
| 2018/0122217 | A1 * | 5/2018 | Mese | G08B 25/10 |
| 2020/0027326 | A1 | 1/2020 | Ravat | |
| 2020/0162701 | A1 * | 5/2020 | Nixon | H04N 7/181 |

* cited by examiner

*Primary Examiner* — Mohammed S Rahaman

(74) *Attorney, Agent, or Firm* — Banner & Witcoff, Ltd.

(57) ABSTRACT

Systems, apparatuses, and methods are described for the detection of a device that may be in the presence of a video camera and may be sending and receiving signals within a local network. The device may be inside or outside the video camera's field of view. The camera or associated network device such as a router may discover the device in the periphery of or outside the field of view of the camera by detecting transmissions from the device, such as WiFi, Bluetooth, cellular or other wireless transmissions. The video camera may determine identifying information for the device from the transmissions and may store and transmit for analysis the information along with captured video.

21 Claims, 7 Drawing Sheets

100
External Network 109
127
Network Interface 108
103
TS 104
Push Server 105
Content Server 106
App Server 107
Server 122
101
102
127
Display Device 112
120
Modem 110
Gateway 111
102a
Landline Phone 117
Set Top Box/ DVR 113
Wireless Device 116
Mobile Device(s) 125
Personal Computer 114
Laptop Computer 115

400
START
Record Video and/or Listen for Wireless Signals 402
Detect Wireless Signal? 404
No
Send Video to Monitoring Entity 406
Yes
Extract Wireless Signal Data 408
Store Detected Wireless Signal Data 410
Prepare Video and Detected Wireless Signal Data 412
Send Video and Detected Wireless Signal Data to Monitoring Entity 414
END

420

| | 422 | 424 | 426 | 428 | |
|---|---|---|---|---|---|
| | DEV_ID | TYPE | TIME | STRENGTH | ... |
| 430 | MAC_1 | WiFi | 05:48:02 11/07/2018 | -90dBm | ... |
| 432 | MAC_2 | Bluetooth | 06:12:06 11/07/2018 | -63dBm | ... |
| 434 | IP_1 | WiFi | 08:37:38 11/07/2018 | -82dBm | ... |
| | ... | ... | ... | ... | ... |

| | 522 | 524 | 526 | 528 | 530 | |
|---|---|---|---|---|---|---|
| | DEV_ID | TYPE | TIME | STRENGTH | SOURCE | ... |
| 532 | MAC_1 | WiFi | 05:48:02 11/07/2018 | -90dBm | GATEWAY | ... |
| 534 | MAC_2 | Bluetooth | 06:12:06 11/07/2018 | -63dBm | CAM_1 | ... |
| 536 | IP_1 | WiFi | 08:37:38 11/07/2018 | -82dBm | CAM_3 | ... |
| | ... | ... | ... | ... | ... | ... |

FIG. 5a

500
START
Receive Video and Listen for Wireless Signals
502
Detect Wireless Signal?
504
No
Send Video to Monitoring Entity
506
Yes
Extract and Process Wireless Signal Data
508
Store Detected Wireless Signal Data
510
Prepare Video and Detected Wireless Signal Data
512
Send Video and Detected Wireless Signal Data to Monitoring Entity
514
END

PERIPHERAL VIDEO PRESENCE DETECTION

CROSS-REFERENCE TO RELATED APPLICATIONS

This application claims priority to and is a continuation of U.S. application Ser. No. 16/205,574, filed Nov. 30, 2018, which is hereby incorporated by reference in its entirety.

BACKGROUND

Video presence detection systems, such as video cameras, may be able detect and provide information regarding images within their field of view. For example, video cameras may capture images of an area, and the images may be processed to detect physical motion which, in turn, may trigger an alarm if movement in that area is not allowed. Video cameras, however, may have limited, or static, fields of view. Additionally, video cameras may be interfered with by blocking the lenses, such as by spray paint.

SUMMARY

The following summary presents a simplified summary of certain features. The summary is not an extensive overview and is not intended to identify key or critical elements.

Systems, apparatuses, and methods are described for the detection of wireless signals (e.g., WiFi beacon signals, Bluetooth signals, cellular telephone signals, etc.) in the presence of a camera, such as a static/moving video camera, even if the source of the wireless signals is not within the camera's field of view. The captured images may be supplemented with wireless signal information indicating the wireless signals that were detected when the images were captured. The wireless signals may be processed to identify devices and/or individuals who were in the vicinity of the camera when the images were captured. Such identification may be useful if, for example, an individual in a captured image cannot be identified from the image alone (e.g., obscured face, face out of focus, etc.), or simply to provide additional context for a memorable photograph (e.g., a photo may indicate which family members were in the area where the photo was taken even if they were not present in the photo). Identifying information of the wireless device, such as IP address, MAC address, device id, etc., may be found in the wireless signals that the wireless device transmits. The camera may store that information, along with other context information such as the date, time, and/or location of the image capture, along with the visual recording. Storage of this information may allow the later identification of a person who was present near, but not within, a video recording.

If multiple cameras are present, such as multiple cameras in a home security system, the multiple cameras may each report the wireless signals that they detect, and the location of the source of the wireless signals may be determined through triangulation of the wireless signals. The location of the source may be provided with the captured image, and may be used to adjust the field of view of one or more cameras to point in the direction of the source.

The system may be configured with a list of predetermined wireless device identities (e.g., MAC addresses of mom's cell phone and dad's cell phone are preprogrammed) that are expected to be in a particular location, and a security system may be configured to react differently if a stranger's wireless device is determined to be in the vicinity of the camera. For example, the system may increase an image capture frequency, increase image resolution, adjust zoom or focus, activate facial recognition system, etc., if an unrecognized or unauthorized wireless device is present.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A shows an example of a registry maintained by a camera in the system of FIG. 3.

FIG. 5A shows an example of a registry maintained by a gateway in the system of FIG. 3.

DETAILED DESCRIPTION

Figure 1:
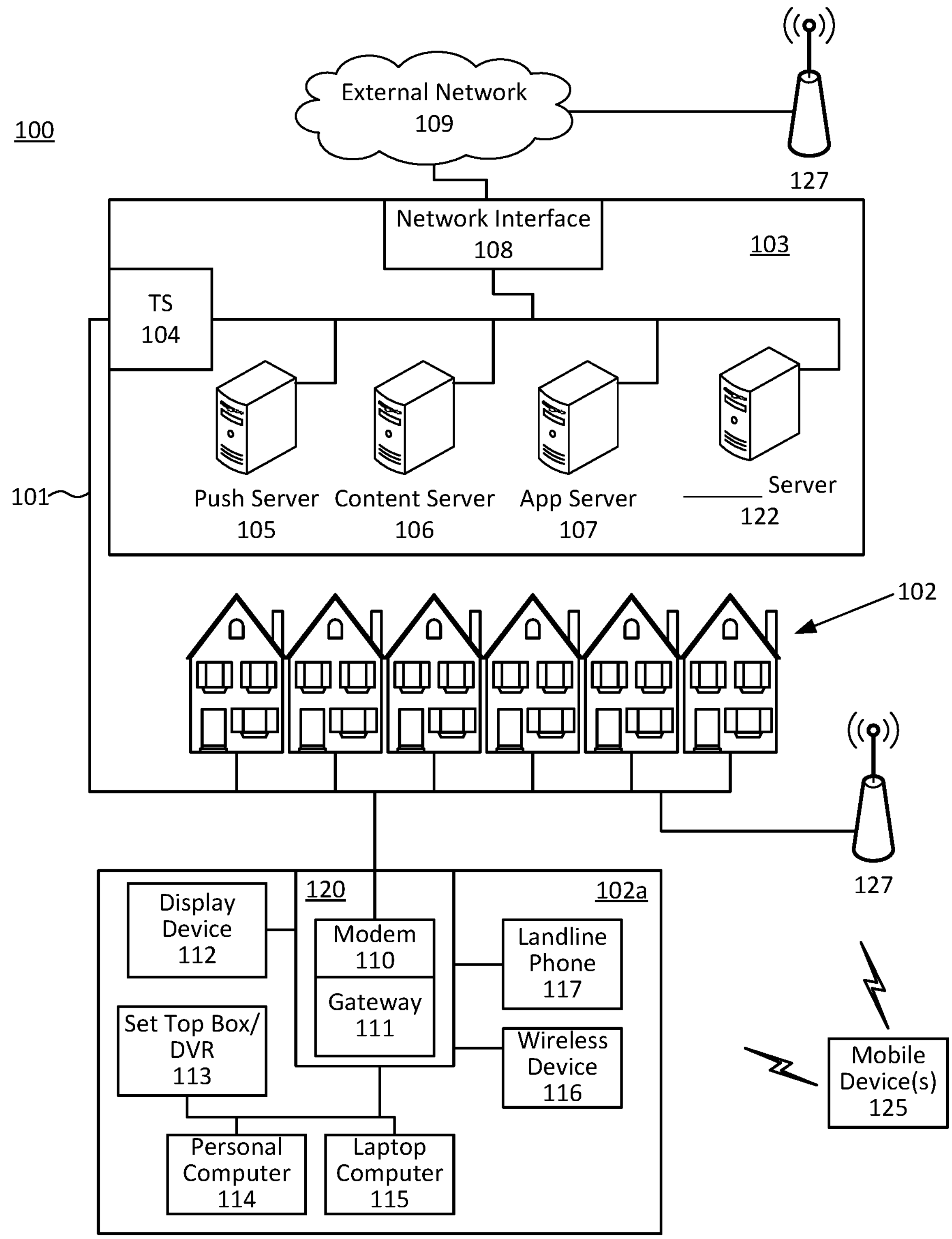
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. Although shown separately, the push server 105, the content server 106, the application server 107, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102*a*. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
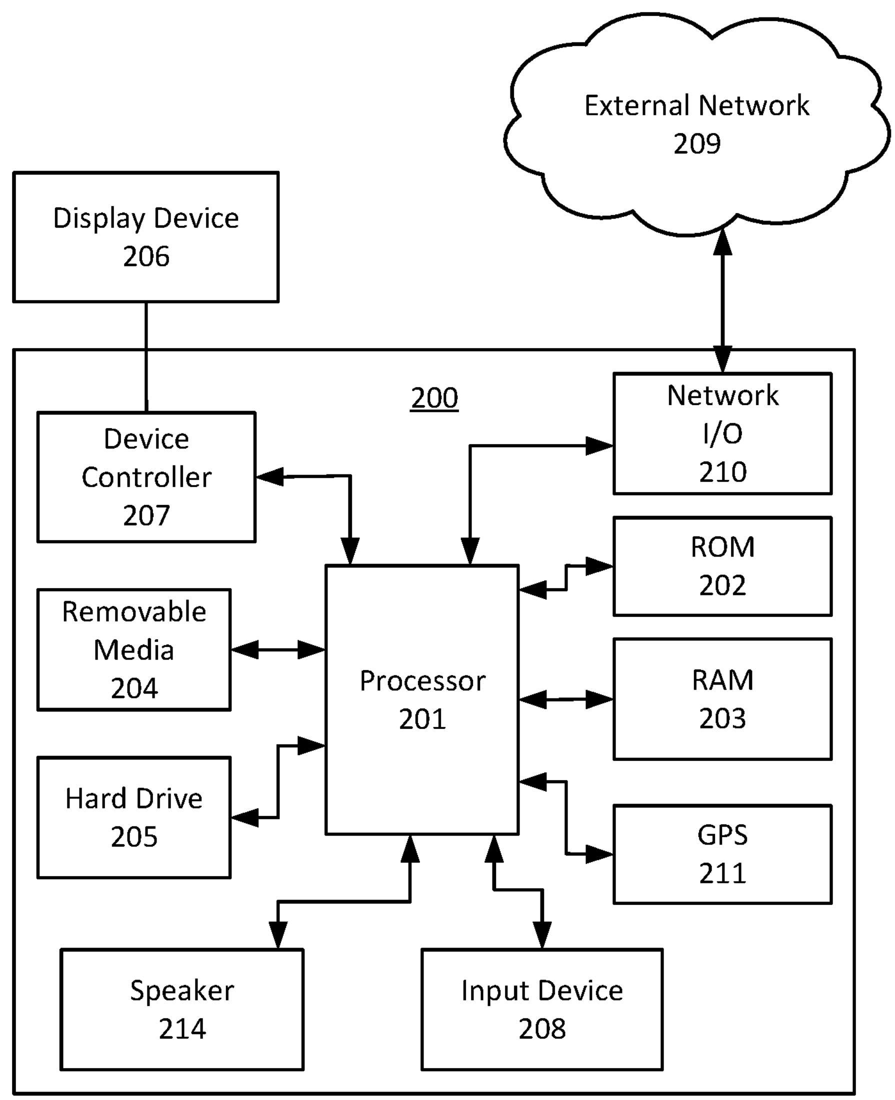
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., cameras such as the camera described in connection with FIG. 3 below). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
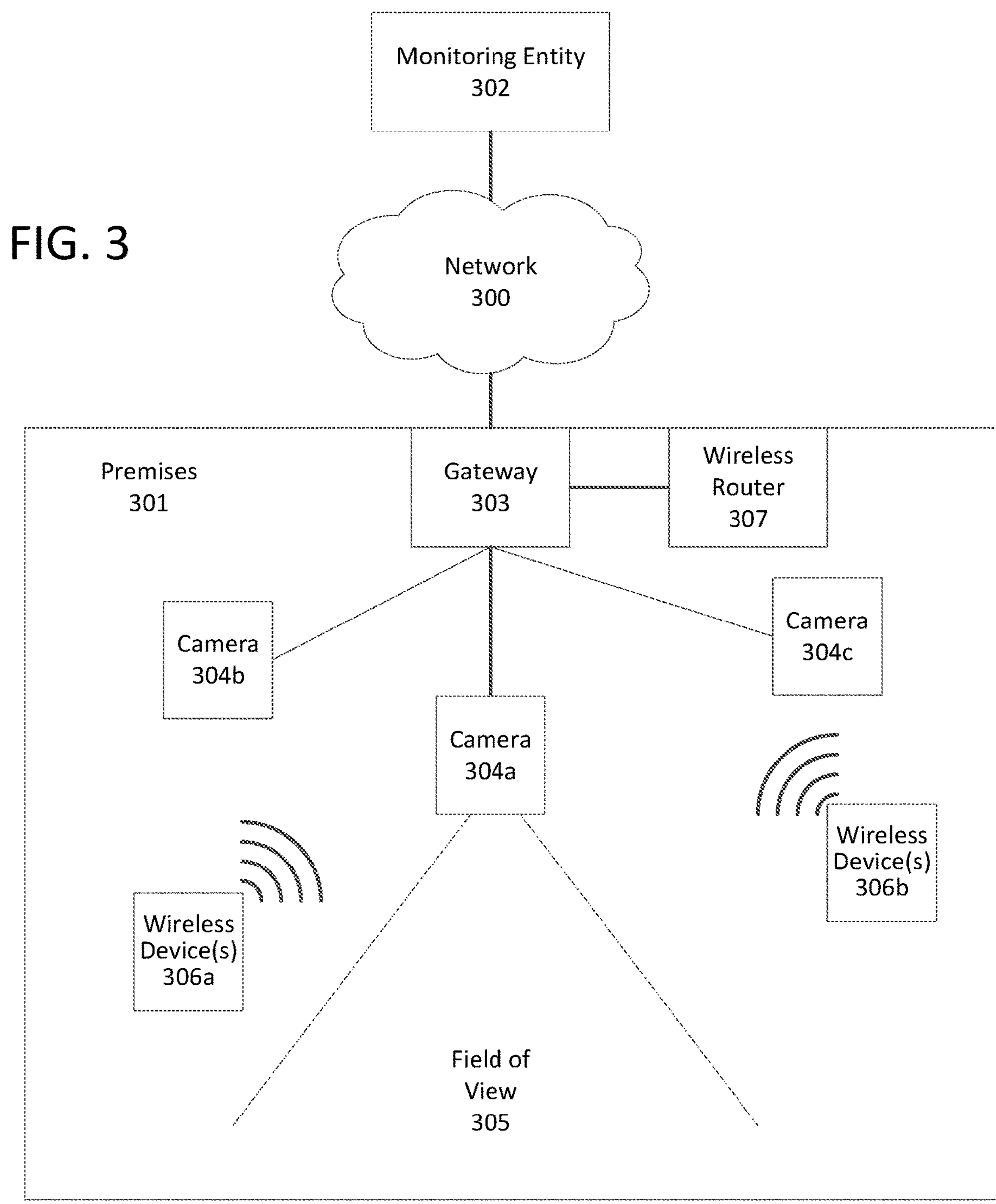
FIG. 3 shows an example of a system for detecting a device that may be inside or outside the field of view of a camera.

FIG. 3 shows an example of a system for capturing images and detecting one or more wireless signals from devices that may be inside or outside the field of view of a camera. One or more elements in FIG. 3 may be elements from FIG. 1. Network 300 may, for example, comprise the communication links 101 and/or the external network 109 and/or other networks. Premises 301 may be a premises such as the premises 102*a*. Monitoring entity 302 may comprise one or more application servers 107 located in one or more local offices 103 or elsewhere. The monitoring entity 302 may be in communication with the premises 301 via the network 300. The monitoring entity 302 may be configured to receive video feeds from the premises 301, and to receive detected wireless signal information indicating wireless signals that were detected by the camera(s) that provided the video. The monitoring entity 302 may also be configured to process the images in the video feeds, and the detected wireless signal information, to determine whether security concerns exist at the premises 301, and if so, send alarm response instructions in response to the security concern.

The monitoring entity 302 is shown as a single element in the example of FIG. 3. Various elements depicted in FIG. 3 may be implemented or grouped together in any way desired. In other examples, the functionality of the monitoring entity 302 may be implemented across two or more computing devices. Also, while the monitoring entity 302 may be located remotely from the premises 301, the monitoring entity 302 may also, or alternatively, be located at the premises 301 (e.g., inside a gateway 303 or another local computing device) and/or located within the camera 304 itself.

The gateway 303 may be, for example, a computing device such as the interface 120 of FIG. 1. The gateway 303 may communicate with the monitoring entity 302 via the network 300. A wireless router 307 may be, for example, configured to provide wireless communication channels to communicate with one or more wireless device(s), such as wireless device(s) 306*a-b*, which may be on- or off-premises. The wireless router 307 is shown located separately from the gateway 303 but may also, or alternatively, be located inside the gateway 303. The premises 301 may also include one or more network enabled cameras, such as camera(s) 304*a-c*. The gateway 303 may communicate with the camera(s) 304*a-c* and/or the wireless router 307 via, e.g., a local network within the premises 301.

Although three cameras are shown in FIG. 3, a premises 301 may include any number of cameras or other visual recording devices. Cameras may comprise any type of recording devices such as video cameras, cameras, computing devices, user devices, and/or other device configured to record video and/or video images. User devices may comprise computing devices such as personal computers, desktop computing devices, laptop computing devices, tablet computing devices, palmtop computing devices, cellular telephones (e.g., smartphones and feature phones), network-enabled televisions (e.g., "smart" televisions), network-enabled video game machines, STBs, DVRs, network-enabled audio devices, network-enabled data storage devices, network enabled home appliances, and other types of computing devices having a network interface suitable for exchanging communications via a local network, the network 300, and/or other networks.

The camera(s) 304*a-c* may be configured to continuously record video of the surrounding area, such as a video camera for a surveillance or security system. Alternatively, the camera(s) 304*a-c* may be configured to record video on demand and/or after a triggering event, such as after detecting movement or detecting a wireless signal (described below). Camera 304*a* may have a field of view 305 that is 360 degrees or less than 360 degrees. The camera(s) 304*a-c* may be configured to send the recorded video upstream to the monitoring entity 302 via the gateway 303. The camera(s) 304*a-c* may be configured to detect wireless signals (e.g., WiFi probe requests, Bluetooth signals, and/or other wireless signals) sent from wireless device(s) 306*a-b* that are within range of the camera(s) 304*a-c*. The camera(s) 304*a-c* may have a WiFi receiver, WiFi antenna, Bluetooth receiver and/or any other type of device that may listen for and/or receive the wireless signals via a local network. The wireless signals need not actually be directed to the camera(s) 304*a-c*, as the camera(s) 304*a-c* may be passively detecting various beacon announcements and other signals that the wireless device(s) 306*a-b* might transmit. The camera(s) 304*a-c* may detect the wireless signals even if the wireless device(s) 306*a-b* are not, for example, within the field of view 305 of the camera 304*a*. The wireless device(s) 306*a-b* may be any type of device that is configured to emit wireless signals, such as computing devices, user devices, smart watches, fitness trackers, and/or other devices that emit such wireless signals.

After detecting such a wireless signal, the camera(s) 304*a-c* may be configured to extract device information from the wireless signal, such as a MAC address, IP address, device ID and/or other device information. The camera(s) 304*a-c* may be configured to detect signal strengths and timing of the wireless signals. The camera(s) 304*a-c* may store the device information and/or signal information to its local registry. The camera(s) 304*a-c* may also store a time stamp for the time at which the signal(s) for the wireless device(s) 306*a-b* were detected. The camera(s) 304*a-c* may be configured to detect and/or store location information associated with a location where the video was recorded at the time the signal(s) for the wireless device(s) 306*a-b* were detected. Examples of this location information may be coordinates from a GPS application on the camera(s) 304*a-c*, information indicating a city, town, ZIP code, mailing address, business name, place of interest, etc., from a map application, and/or information from any other desired location-tagging software for taking pictures. The camera(s) 304*a-c* may tag the video by injecting the registry into the video before sending the video to the monitoring entity 302 as described in more detail herein.

Like the camera(s) 304*a-c*, other entities, such as the gateway 303 and/or the wireless router 307, may also, or alternatively, be configured to detect wireless signals sent from wireless device(s) 306*a-b* via a local network that are within range of the gateway 303 and/or wireless router 307, and may be inside or outside the field of view 305 of the camera 304*a*. After detecting such a wireless signal, the gateway 303 may likewise be configured to extract device information from the wireless signal. The gateway 303 may be configured to detect signal strengths and timing of the wireless signals and may also be configured to use triangulation to determine location of the wireless device(s) 306*a-b*. The gateway 303 may also be configured to detect and/or store location information associated with the location where the video was recorded at the time the signal(s) for the wireless device(s) 306*a-b* were detected. The gateway 303 may be configured to determine, either alone or in communication with the wireless router 307, whether the wireless device(s) 306*a-b* are registered devices whose addresses are previously known to the gateway 303 and/or wireless router 307. The gateway 303 may store the extracted wireless signal information locally. Additionally, or alternatively, the gateway 303 may add this wireless signal information to the video before sending the video to the monitoring entity 302. Regardless of whether the tagged videos are stored at the monitoring entity 302, gateway 303, camera(s) 304*a-c* and/or other storage location, a user may be able to search the tagged videos for his/her MAC address, or other identifying information, and thereby retrieve videos that the user was not in, but was nearby. The monitoring entity 302 may also be configured to process the video, retrieve the list of devices that were tagged by the camera(s) 304*a-c* and/or gateway 303 and send the video to the devices that were tagged in the video.

The features described above may be implemented in any device having a camera, such as a smartphone having a camera. The smartphone may be configured to detect Bluetooth, Wi-Fi, cellular, and other wireless signals, and may be configured to report wireless signals that are detected at or around a time when a particular photograph or video was captured. The smartphone may be configured to detect the wireless signals based on the opening of an application for capturing this data and/or during the time the application is active. This wireless signal information can be reported along with global positioning system (GPS) information, and a user may view a photo album in which each photo can indicate not only where the photo was taken, but who was in the area (and not pictured) based on the fact that the camera detected wireless signals from wireless devices of those individuals who were outside of the photo. Photographs and videos may be tagged with information identifying GPS location and individuals who were nearby at the time the photos and videos were captured, and they may be shared on social media. Users may search for images based on identities of individuals who were not in the photos. A user may manually tag individuals who appear in a photograph, and remaining individuals whose wireless devices were detected may be tagged as having been present but not shown in the photograph or video.

Figure 4:
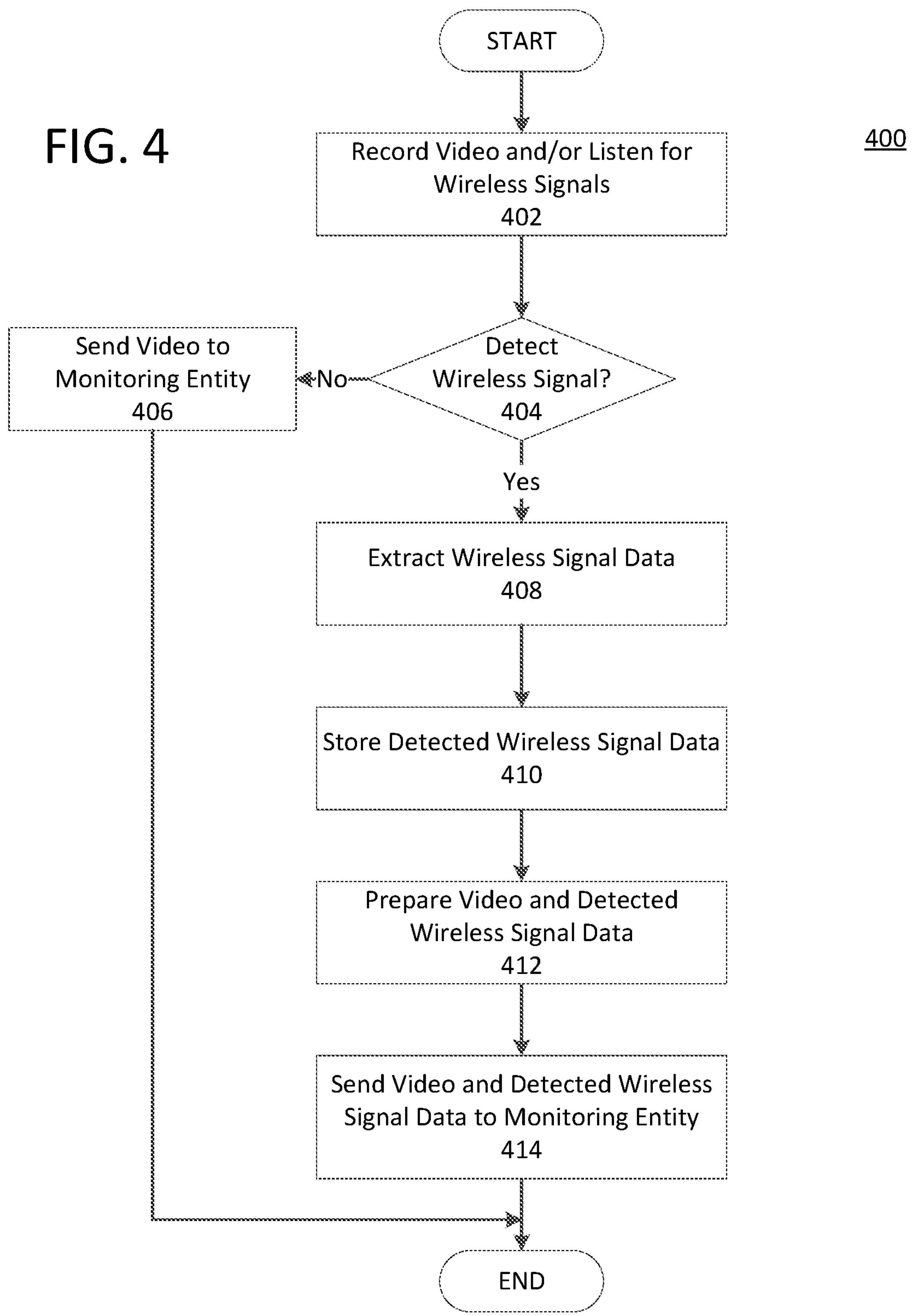
FIG. 4 is a flow chart showing an example method for detecting a device that may be inside or outside the field of view of a camera.
Figure 5:
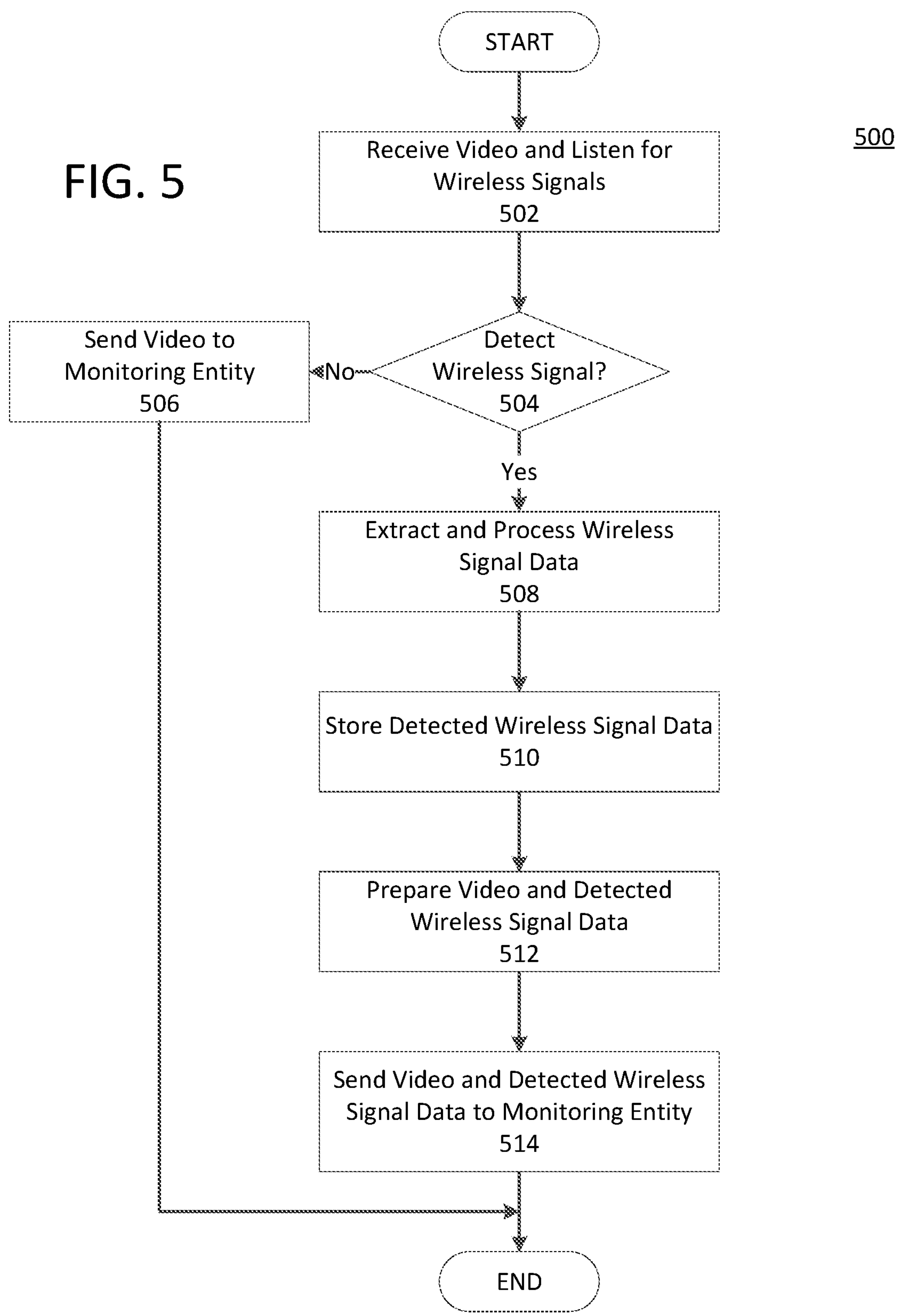
FIG. 5 is a flow chart showing an additional example method for detecting a device that may be inside or outside the field of view of a camera.
Figure 6:
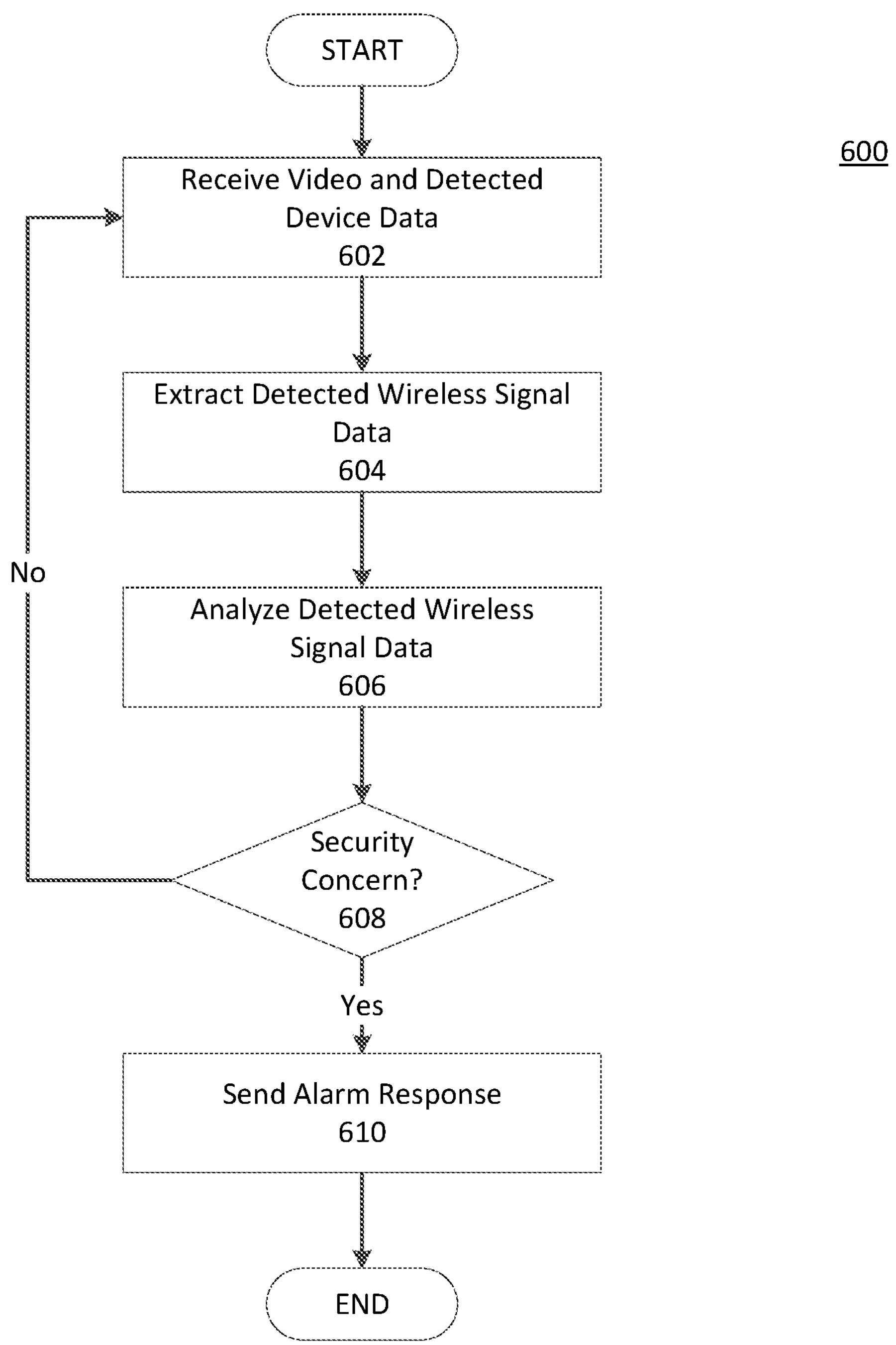
FIG. 6 is a flow chart showing an additional example method for detecting a device that may be inside or outside the field of view of a camera.

FIGS. 4-6 are flow charts showing example methods performed by a camera (FIG. 4), a gateway (FIG. 5) and a monitoring entity (FIG. 6) in the system of FIG. 3. The methods of FIGS. 4-6 could also, or alternatively, be performed in connection with other elements in other networks. The methods shown in FIGS. 4-6 and/or one or more steps thereof may be performed based on execution, by one or more processors of one or more computing devices, of instructions that are stored in a computer-readable medium, such as a non-transitory computer-readable memory. The steps in these flow diagrams need not all be performed in the order described or shown, and some steps may be omitted and/or otherwise changed.

FIG. 4 is a flow chart showing an example method 400 performed by the camera 304*a* for detecting a device that may be inside or outside the field of view of the camera. In step 402, the camera 304*a* may record video, continuously, or upon demand. While recording video or in standby mode, the camera 304*a* may be listening for wireless signals within range of the camera 304*a*. The wireless signals may be sent from devices that may be inside or outside the field of view 305 of the camera 304*a*.

In step 404, the camera 304*a* may detect via a local network one or more wireless signals from wireless device(s) 306*a-b* such as a WiFi probe request sent by a wireless device seeking a WiFi hotspot, a Bluetooth signal that may have been sent in response to a Bluetooth beacon, LTE signal and/or other wireless signal. In step 406, if a wireless signal is not detected, the camera 304*a* may send the video to the monitoring entity 302 and may continue to listen for other wireless signals from wireless device(s) within range of the camera 304*a*. If a wireless signal is detected, the camera 304*a* may, in step 408, extract data from the wireless signal regarding the wireless device(s) 306*a-b* that sent the detected wireless signal. The data may comprise information about the wireless device, such as a MAC address, IP address, device ID, and/or other information related to the identity of the wireless device(s) that sent the wireless signal(s). The camera 304*a* may extract information from the wireless signal that may help to determine the location of the wireless device that sent the signal, such as the signal strength of the wireless signal and/or the timing between wireless signals from the same wireless device.

Alternatively, the camera 304*a* may be listening for wireless signals but not recording video. Detection of a wireless signal by the camera 304*a* may cause the camera 304*a* to start recording and extract data as described in step 408 above.

In step 410, the camera 304*a* may store the extracted data to a local registry. The camera 304 may also, or alternatively, store a time stamp or timecode for the detection of the wireless device(s) 306*a-b* and/or a location where the video was recorded. Any information stored by the camera 304 regarding the detected wireless device(s) 306*a-b* will be referred to, collectively, as detected wireless signal information. The camera 304*a* may maintain a list of detected wireless devices in the registry 420 as shown in FIG. 4A and/or other storage locations available to the camera 304*a*. Registry 420 is shown in the form of a table, where column 422 may include uniquely identifying device information, such as a MAC address, for each wireless signal detected. In the example of FIG. 4A, the devices in rows 430 and 432 are indicated by their MAC addresses, denoted MAC_1 and MAC_2, respectively, and the device in row 434 is indicated by an IP address, denoted IP_1. Column 424 may indicate the type of wireless signal detected, such as WiFi or Bluetooth. Column 426 may indicate the date and time the wireless signal was detected. Column 428 may indicate the signal strength of the wireless signal at the time indicated in the time stamp. The registry 420 may also indicate all or some of the information relating to the wireless signal described here and/or any other desired parameter of the wireless signal. The registry 420 may be continuously updated as long as the camera is active, even when a photograph or video is not currently being captured. Alternatively, the camera may be configured to perform the wireless signal detection while a photograph or video is recorded, or while a camera application is active and a photograph or video is likely. The camera 304*a* may be configured to clear the registry 420 after sending the wireless signal information upstream or after storing the wireless signal information locally.

In step 412, as video segments are recorded and encoded or compressed for transmission by the camera 304*a*, the camera 304*a* may tag the recorded video by injecting the registry 420 and/or detected wireless signal information into the video signal. The camera 304*a* may encode the detected wireless signal information in a video frame, pass the detected wireless signal information along as separate bytes, send the detected wireless signal information along with the video as a separate file, and/or send the detected wireless signal information as metadata, for example, using the H.264 standard to send the metadata via User Data Supplemental Enhancement Information (SEI) messages. In step 414, the camera 304 may send the video and detected wireless signal information to the monitoring entity 302 via the gateway 303. The stored video and detected wireless signal information may be searchable for specific device information.

FIG. 5 is a flow chart showing another example method 500 performed by the gateway 303 for detecting a device that may be inside or outside the field of view of the camera. Although FIGS. 4 and 5 show the camera 304 and the gateway 303, respectively, as the device that detects the presence of a device that may be inside or outside the field of view of the camera, computing devices other than camera 304 and gateway 303 could perform the operations shown and described in FIGS. 4 and 5.

In step 502, the gateway 303 may receive a video signal from one or more cameras, such as cameras 304*a-c*. The video signal may be, e.g., the video and detected wireless signal information sent by the camera 304*a* in step 414 of FIG. 4. Additionally, or alternatively, the video signal may be the video recorded by the camera 304*a* in step 402 of FIG. 4 without the detected wireless signal information. The gateway 303 may also listen for other wireless signals within range of the gateway 303.

In step 504, the gateway 303 may detect one or more wireless signals from wireless device(s) 306*a-b*. If a wireless signal is not detected, in step 506, the gateway 303 may send the video to the monitoring entity 302 and may continue to listen for wireless signals from devices, such as wireless device(s) 306*a-b*. If a wireless signal is detected, the gateway 303 may, in step 508, extract information from the wireless signal regarding the wireless device(s) 306*a-b*, such as a MAC address, IP address, device ID, and/or other information related to the identity of the wireless device(s) that sent the wireless signal. The gateway 303 may communicate with the wireless router 307 to determine whether the wireless device(s) 306*a-b* are registered and/or otherwise known to the gateway 303. If so, the gateway 303 may have access to additional information related to the wireless device(s) 306 and/or the owner of the wireless device(s) 306. The gateway 303 may determine whether the wireless device(s) 306*a-b* are trusted devices by comparing the device information to a predetermined list of trusted devices for the premises. Additionally, or alternatively, the gateway 303 may be configured to ignore wireless device(s) 306*a-b* that are indicated on the predetermined list of recognized and/or trusted devices.

The gateway 303 may also extract information from the wireless signal that may help to determine the location of the wireless device(s) 306*a-b* that sent the wireless signal. The gateway 303 may also, or alternatively, determine and/or extract location information from the wireless signal for the location where the video was recorded at the time the wireless signal was detected. The gateway 303 may detect the signal strength of the wireless signal and may use the signal strength to determine the distance of the wireless device(s) 306*a-b* from the gateway 303. The gateway 303 may further determine which direction the wireless device 306 is from the gateway 303 by triangulating the wireless signal, using video feeds and information from the camera(s) 304*a-c*. The gateway 303 may also extract or detect information regarding the timing between any wireless signals from the same wireless device(s) 306*a-b* that may indicate whether the wireless device(s) 306*a-b* are moving away from, or toward, the gateway 303.

In step 510, the gateway 303 may store any detected wireless signal information to a local registry, such as shown in FIG. 5A. The gateway 303 may maintain a list of wireless device(s) detected in the local registry 520 and/or in one or more locations within the network 300 that are accessible by the gateway 303. Like FIG. 4A, the registry 520 is shown in the form of a table, where column 522 may include device information for each wireless signal detected. The devices in rows 532 and 534 are indicated by their MAC addresses, denoted MAC_1 and MAC_2, respectively, and the device in row 536 is indicated by an IP address, denoted IP_1. Column 524 may indicate the type of wireless signal detected, such as WiFi or Bluetooth. Column 526 may indicate the date and time the wireless signal was detected. Column 528 may indicate the signal strength of the wireless signal at the time indicated in the time stamp. Column 530 may indicate which device detected the wireless signal. For example, in row 532, the wireless signal was detected by the gateway and in rows 534 and 536, the wireless signals were detected by cameras, indicated by CAM_1 and CAM_3, respectively. The registry 520 may also indicate all or some of the information relating to the wireless signal described here and/or any other desired parameter of the wireless signal. The registry 520 may be continuously updated as long as the gateway 303 is active even when a video feed is not currently being received. The stored video and detected wireless signal information may be searchable for specific device information, such as the device MAC address.

In step 512, as video is received from the camera 304, the gateway 303 may tag the recorded video by injecting the registry 520 and/or detected wireless signal information into the video signal. The gateway may encode the detected wireless signal information in a video frame, pass the detected wireless signal information along as separate bytes, send the detected wireless signal information along with the video as a separate file, and/or send the wireless signal information as metadata. The wireless signal information added by the gateway 303 in step 512 may be in addition to, or as an alternative to the, wireless signal information added by the camera 304*a* before sending the video to the gateway 303, e.g., in step 412 of FIG. 4. In step 514, the gateway 303 may send the video and wireless signal information to the monitoring entity 302 via the network 300.

FIG. 6 is a flow chart showing an example method 600 performed by the monitoring entity 302 for determining whether detected wireless signals warrant further action, such as signaling or escalating an alarm. In step 502, the monitoring entity 302 receives video and wireless signal information from the gateway 303. The video and wireless signal information may be, e.g., the video and detected data sent by or via the gateway 303 in step 414 of FIG. 4 and/or step 514 of FIG. 5. The video and wireless signal information may comprise the wireless device identities that the camera or gateway extracted from the wireless signals it detected at the time the picture or video was captured. This data may be stored locally at the monitoring entity 302 and/or in one or more locations within the network 300 that are accessible by the monitoring entity 302. In step 604, the monitoring entity 302 may extract any wireless signal information embedded in, or sent along with, the video. The monitoring entity 302 may store the extracted wireless signal information separately from, or in conjunction with, the video. The stored wireless signal information may be searchable for a particular device.

In step 606, the monitoring entity 302 may analyze the detected wireless signal information. The monitoring entity 302 may compare the detected wireless signal information to a list of known, registered, or otherwise trusted device(s) for the premises 301. The monitoring entity 302 may identify the owner of the device by using the detected wireless signal information to look up other users of the same monitoring entity. The monitoring entity 302 may retrieve and/or store any additional device or owner information associated with the wireless device(s) 306 along with the detected wireless signal information. The owner information may comprise the owner's name, address, other devices owned, a pre-stored image, or any other identifying information. The owner information may be used to determine whether the device and/or the owner of the device is trusted. The monitoring entity may also determine whether a trusted device is outside of the temporal limitations set for the device. For example, if the premises is a place of business and an employee's cell phone (which during the day may be considered a trusted device) is detected outside of business hours, the monitoring entity 302 may consider the employee's cell phone untrusted at that time of day.

In step 608, the monitoring entity may determine if the detected wireless signal information indicates a security concern. If the wireless device(s) 306*a-b* is trusted for the premises 301 and/or the detected information does not otherwise indicate a security concern, the monitoring entity continues to receive video and wireless signal information as in step 602. If the wireless device(s) 306*a-b* are not trusted device(s) and/or the detected wireless signal information indicates a security concern is present at the premises 301, in step 610, the monitoring entity 302 may send an alarm response downstream to the camera(s) 304*a-c* and/or gateway 303. An alarm response may be one or more of any types of instructions to the gateway 303 and/or the camera(s) 304, such as an instruction to focus the camera 304*a* toward the location of the source of the wireless signal that may have been determined by the gateway 303, which may require panning the camera 304*a* toward the determined location. Another alarm response may be to activate additional camera(s) (e.g., other security camera, camera drones) at or near the premises 301. The monitoring entity 302 may activate a second camera that is closer to the determined location of the source of the wireless signal. The monitoring entity 302 may instruct the camera 304, gateway 303 and/or any newly activated camera(s) to collect other types of data, such as audio data, infrared data, and/or RF data. The monitoring entity 302 may use the detected location information determined by the camera 304 and/or the gateway 303 to track the detected device and/or determine if the detected device is inside or outside of the premises 301. The monitoring entity 302 may also activate an alarm at the premises 301. The type of alarm response may be based on the preference of a customer, the type of equipment located at the premises 301, and/or the type of security concern detected.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:

receiving, by a computing device and from a camera:
 data captured by the camera; and
 information indicating a source of a wireless signal that was detected at a time associated with capture of the data by the camera;

determining, by the computing device and based on the data, that the source is outside a field of view of the camera;

determining, based on the determining that the source is outside the field of view, a location of the source;

activating, based on the location of the source, a second camera; and storing, in a database, second data from the second camera, the information indicating the source, and the location of the source.

2. The method of claim 1, wherein the camera is located at a premises, the method further comprising:

determining, based on a list of predetermined trusted devices for the premises, that the source of the wireless signal is not a trusted device; and causing, based on the location of the source of the wireless signal, the camera to pan toward the location.

3. The method of claim 1, further comprising:

receiving, from the second camera, the second data; and determining, based on the second data, that the source is in a second field of view of the second camera.

4. The method of claim 1, wherein the second camera is associated with a drone, and the method further comprising:

sending the drone to the location of the source of the wireless signal; and causing the drone to track the source of the wireless signal until the wireless signal is no longer detected.

5. The method of claim 1, wherein the determining the location of the source comprises triangulating the location.

6. The method of claim 1, further comprising injecting the second data with the information indicating the source to generate updated data; and sending, via a network, the updated data to a monitoring entity.

7. The method of claim 1, wherein the data comprises one or more of:

at least one video, at least one audio, or at least one picture.

8. A system comprising:

a computing device and a camera, wherein the computing device comprises:

one or more first processors; and memory storing first instructions that, when executed by the one or more first processors, cause the computing device to:

receive from the camera:

data captured by the camera; and information indicating a source of a wireless signal that was detected at a time associated with capture of the data by the camera;

determine, based on the data, that the source is outside a field of view of the camera;

determine, based on the determination that the source is outside the field of view, a location of the source;

activate, based on the location of the source, a second camera; and store, in a database, second data from the second camera, the information indicating the source, and the location of the source; and wherein the camera comprises:

one or more second processors; and memory storing second instructions that, when executed by the one or more second processors, cause the camera to:

send the data captured by the camera and the information indicating the source of the wireless signal that was detected at the time associated with capture of the data by the camera.

9. The system of claim 8, wherein the camera is located at a premises, and wherein the first instructions, when executed by the one or more first processors, further cause the computing device to:

determine, based on a list of predetermined trusted devices for the premises, that the source of the wireless signal is not a trusted device; and cause, based on the location of the source of the wireless signal, the camera to pan toward the location.

10. The system of claim 8, wherein the first instructions, when executed by the one or more first processors, further cause the computing device to:

receive, from the second camera, the second data; and determine, based on the second data, that the source is in a second field of view of the second camera.

11. The system of claim 8, wherein the second camera is associated with a drone, and wherein the first instructions, when executed by the one or more first processors, further cause the computing device to:

send the drone to the location of the source of the wireless signal; and cause the drone to track the source of the wireless signal until the wireless signal is no longer detected.

12. The system of claim 8, wherein the first instructions, when executed by the one or more first processors, further cause the computing device to:

determine the location of the source by triangulating the location.

13. The system of claim 8, wherein the first instructions, when executed by the one or more first processors, further cause the computing device to:

inject the second data with the information indicating the source to generate updated data; and send, via a network, the updated data to a monitoring entity.

14. The system of claim 8, wherein the data comprises one or more of:

at least one video, at least one audio, or at least one picture.

15. One or more non-transitory computer readable media storing instructions that, when executed, cause:

receiving, by a computing device and from a camera:

data captured by the camera; and information indicating a source of a wireless signal that was detected at a time associated with capture of the data by the camera;

determining, by the computing device and based on the data, that the source is outside a field of view of the camera;

determining, based on the determining that the source is outside the field of view, a location of the source;

activating, based on the location of the source, a second camera; and storing, in a database, second data from the second camera, the information indicating the source, and the location of the source.

16. The one or more non-transitory computer readable media of claim 15, wherein the camera is located at a premises, and wherein the instructions, when executed, cause:

determining, based on a list of predetermined trusted devices for the premises, that the source of the wireless signal is not a trusted device; and causing, based on the location of the source of the wireless signal, the camera to pan toward the location.

17. The one or more non-transitory computer readable media of claim 15, wherein the instructions, when executed, cause:

receiving, from the second camera, the second data; and determining, based on the second data, that the source is in a second field of view of the second camera.

18. The one or more non-transitory computer readable media of claim 15, wherein the second camera is associated with a drone, and wherein the instructions, when executed, cause:

sending the drone to the location of the source of the wireless signal; and causing the drone to track the source of the wireless signal until the wireless signal is no longer detected.

19. The one or more non-transitory computer readable media of claim 15, wherein the instructions, when executed, cause:

determining the location of the source by triangulating the location.

20. The one or more non-transitory computer readable media of claim 15, wherein the instructions, when executed, cause:

injecting the second data with the information indicating the source to generate updated data; and sending, via a network, the updated data to a monitoring entity.

21. The one or more non-transitory computer readable media of claim 15, wherein the data comprises one or more of:

at least one video, at least one audio, or at least one picture.

* * * * *